US011915892B2

(12) United States Patent
Li et al.

(10) Patent No.: US 11,915,892 B2
(45) Date of Patent: Feb. 27, 2024

(54) SWITCH FOR VEHICLE AND VEHICLE

(71) Applicant: NIO TECHNOLOGY (ANHUI) CO., LTD, Hefei (CN)

(72) Inventors: Lv Li, Shanghai (CN); Jiawen Zheng, Shanghai (CN); Chenguang Geng, Shanghai (CN); Lin Mu, Shanghai (CN); Rui Zhang, Shanghai (CN)

(73) Assignee: NIO TECHNOLOGY (ANHUI) CO., LTD, Hefei (CN)

( * ) Notice: Subject to any disclaimer, the term of this patent is extended or adjusted under 35 U.S.C. 154(b) by 0 days.

(21) Appl. No.: 17/579,855

(22) Filed: Jan. 20, 2022

(65) Prior Publication Data

US 2022/0230823 A1 Jul. 21, 2022

(30) Foreign Application Priority Data

Jan. 21, 2021 (CN) ........................ 202110083700.1

(51) Int. Cl.
*H01H 23/16* (2006.01)
*H01H 23/30* (2006.01)

(52) U.S. Cl.
CPC ............ *H01H 23/16* (2013.01); *H01H 23/30* (2013.01); *H01H 2221/044* (2013.01)

(58) Field of Classification Search
CPC .... H01H 23/143; H01H 23/30; H01H 23/025; H01H 2300/03; H01H 23/145; H01H 2221/016; H01H 23/14; H01H 23/04; H01H 23/168; H01H 2221/018; H01H 23/02; H01H 23/12; H01H 23/003; H01H 23/146;

(Continued)

(56) References Cited

U.S. PATENT DOCUMENTS 5,115,108 A * 5/1992 Ogawa ................. H01H 13/705 200/1 B
5,584,380 A * 12/1996 Naitou ................. H01H 23/145 200/315

(Continued)

*Primary Examiner* — Ahmed M Saeed
(74) *Attorney, Agent, or Firm* — Sheridan Ross P.C.

(57) ABSTRACT

The invention relates to the field of switches, and particularly provides a switch for a vehicle and a vehicle. The invention aims to solve the problems of switch zero drift and shaking caused by the existence of a dimensional deviation of a switch of an existing vehicle. To this end, the switch according to the invention comprises a pressing rocking bar, a first push rod, a second push rod, a first elastic member, a second elastic member, a first limiting body, a second limiting body, and a housing, wherein the pressing rocking bar is pivotally connected to the housing; the first push rod and the second push rod respectively run through the first limiting body and the second limiting body and abut against bottoms of a first end and a second end of the pressing rocking bar, and the second push rod abuts against the second limiting body; and the first elastic member and the second elastic member are fixedly arranged and respectively connected to bottoms of the first push rod and the second push rod, torque of the second push rod acting on the second end is greater than torque of the first push rod acting on the first end, and a moving gap is reserved between the first limiting body and the first push rod in a pressing direction of the first push rod. Switch shaking is prevented and switch position accuracy is ensured.

9 Claims, 4 Drawing Sheets

(58) Field of Classification Search
CPC ........ H01H 23/16; H01H 23/20; H01H 23/28; H01H 23/00; H01H 23/148; H01H 23/24; H01H 23/26
See application file for complete search history.

(56) References Cited

U.S. PATENT DOCUMENTS

| | | | | |
|---|---|---|---|---|
| 5,655,650 | A * | 8/1997 | Naitou | H01H 13/705 200/512 |
| 6,274,826 | B1 * | 8/2001 | Serizawa | H01H 23/003 200/1 B |
| 7,060,920 | B2 * | 6/2006 | Serizawa | H01H 23/003 200/1 B |

* cited by examiner

SWITCH FOR VEHICLE AND VEHICLE

CROSS-REFERENCE TO RELATED APPLICATION

This application claims the benefit of China Patent Application No. 202110083700.1 filed Jan. 21, 2021, the entire contents of which are incorporated herein by reference in its entirety.

TECHNICAL FIELD

The invention relates to the technical field of switches, and particularly provides a switch for a vehicle and a vehicle.

BACKGROUND ART

In the field of vehicles, a switch of an existing vehicle is exquisite in modeling design, but in the manufacturing process of the switch, tolerance inevitably exists. With regard to a toggle switch, it is difficult to ensure a flush and clearance between toggle keys due to the existence of manufacturing tolerance, and a slight dimensional deviation is amplified by many times in the flush of parts, which greatly affects texture of products, and may further cause switch shaking Product accuracy of a high-end product is ensured by strict dimensional control, but this requires a higher production cost. Strict dimensional control over a switch product is given up for a low-end product to ensure a low product cost, thereby sacrificing product texture.

Accordingly, a novel switch for a vehicle and a vehicle are required in this field to solve the problems of switch zero drift and shaking caused by the existence of the dimensional deviation of the switch of the existing vehicle.

SUMMARY OF THE INVENTION

To solve the foregoing problems in the prior art, that is, to solve the problems of switch zero drift and shaking caused by the existence of a dimensional deviation of a switch of an existing vehicle, the invention provides a first implementation of a switch for a vehicle. The switch comprises a pressing rocking bar, a first push rod, a second push rod, a first elastic member, a second elastic member, and a housing, wherein the pressing rocking bar is pivotally connected to the housing, and a position point at which the pressing rocking bar is pivotally connected to the housing is disposed between the first push rod and the second push rod; the switch further comprises a first limiting body and a second limiting body, the first limiting body and the second limiting body are fixedly arranged, the first push rod runs through the first limiting body and abuts against the bottom of a first end of the pressing rocking bar, the second push rod runs through the second limiting body and abuts against the bottom of a second end of the pressing rocking bar, and the second push rod abuts against the second limiting body; and the first elastic member is fixedly arranged and connected to the bottom of the first push rod, the second elastic member is fixedly arranged and connected to the bottom of the second push rod, prepressures on the second elastic member and the first elastic member enable torque of the second push rod acting on the second end of the pressing rocking bar to be greater than torque of the first push rod acting on the first end of the pressing rocking bar, and a moving gap is reserved between the first limiting body and the first push rod in a pressing direction of the first push rod.

In a preferred technical solution of the foregoing switch for a vehicle, the first push rod is provided with a first protrusion, the first protrusion is disposed between the first limiting body and the first elastic member, the moving gap is reserved between the first protrusion and the first limiting body, the second push rod is provided with a second protrusion, and the second push rod abuts against the second limiting body through the second protrusion.

In a preferred technical solution of the foregoing switch for a vehicle, with the bottom of the pressing rocking bar used as a reference surface, a height from the bottom of the first limiting body to the reference surface is less than a height from the bottom of the second limiting body to the reference surface, and a height difference is a height of the moving gap.

In a preferred technical solution of the foregoing switch for a vehicle, the second protrusion is disposed between the second limiting body and the second elastic member; and with the bottom of the pressing rocking bar used as a reference surface, a height from the reference surface to a top end of the first protrusion is greater than a height from the reference surface to a top end of the second protrusion, and a height difference is a height of the moving gap.

In a preferred technical solution of the foregoing switch for a vehicle, cross sections of the first limiting body and the second limiting body are each in an n shape, the first push rod is slidably connected to an inner wall of the first limiting body, and the second push rod is slidably connected to an inner wall of the second limiting body; and/or, the first limiting body and the second limiting body are integrally connected to the housing.

In a preferred technical solution of the foregoing switch for a vehicle, a position point at which the pressing rocking bar is pivotally connected to the housing is located at a middle portion of the pressing rocking bar; and/or, the pressing rocking bar comprises a poking key and a rocking bar body, the poking key is disposed on the rocking bar body, the first push rod runs through the first limiting body and abuts against the bottom of a first end of the rocking bar body, and the second push rod runs through the second limiting body and abuts against the bottom of a second end of the rocking bar body.

The invention further provides a second implementation of a switch for a vehicle. The switch comprises a pressing rocking bar, a first push rod, a second push rod, a first elastic member, a second elastic member, and a housing, wherein the pressing rocking bar is pivotally connected to the housing, and a position point at which the pressing rocking bar is pivotally connected to the housing is disposed between the first push rod and the second push rod; the switch further comprises a first limiting body and a second limiting body, the first limiting body and the second limiting body are fixedly arranged, the first push rod runs through the first limiting body and abuts against the bottom of a first end of the pressing rocking bar, the second push rod runs through the second limiting body and abuts against the bottom of a second end of the pressing rocking bar, and the second push rod abuts against the second limiting body; and the first elastic member is fixedly arranged and connected to the bottom of the first push rod, the second elastic member is fixedly arranged and connected to the bottom of the second push rod, prepressures on the second elastic member and the first elastic member enable torque of the second push rod acting on the second end of the pressing rocking bar to be greater than torque of the first push rod acting on the first end of the pressing rocking bar, and the first push rod is a cylindrical rod without a boss.

The invention further provides a third implementation of a switch for a vehicle. The switch comprises a pressing rocking bar, a first push rod, a second push rod, a first elastic member, a second elastic member, and a housing, wherein the pressing rocking bar is pivotally connected to the housing, and a position point at which the pressing rocking bar is pivotally connected to the housing is disposed between the first push rod and the second push rod; the switch further comprises a first limiting body and a second limiting body, the first limiting body and the second limiting body are fixedly arranged, the first push rod runs through the first limiting body and abuts against the bottom of a first end of the pressing rocking bar, and the second push rod runs through the second limiting body and abuts against the bottom of a second end of the pressing rocking bar; and the first elastic member is fixedly arranged and connected to the bottom of the first push rod, the first push rod abuts against the first limiting body and makes the first elastic member in a compressed state, the second elastic member is fixedly arranged and connected to the bottom of the second push rod, and the second push rod abuts against the second limiting body and makes the second elastic member in a compressed state.

In a preferred technical solution of the foregoing switch for a vehicle, cross sections of the first limiting body and the second limiting body are each in an n shape, the first push rod is slidably connected to an inner wall of the first limiting body, the second push rod is slidably connected to an inner wall of the second limiting body, the first push rod is provided with a first protrusion, the second push rod is provided with a second protrusion, the first protrusion abuts against the bottom of the first limiting body and makes the first elastic member in a compressed state, and the second protrusion abuts against the bottom of the second limiting body and makes the second elastic member in a compressed state.

The invention further provides a vehicle. The vehicle comprises a switch for a vehicle according to any one of the foregoing technical solutions.

It may be understood by those skilled in the art that, in the technical solution of the invention, the switch comprises a pressing rocking bar, a first push rod, a second push rod, a first elastic member, a second elastic member, and a housing, wherein the pressing rocking bar is pivotally connected to the housing, and a position point at which the pressing rocking bar is pivotally connected to the housing is disposed between the first push rod and the second push rod; the switch further comprises a first limiting body and a second limiting body, the first push rod runs through the first limiting body and abuts against the bottom of a first end of the pressing rocking bar, the second push rod runs through the second limiting body and abuts against the bottom of a second end of the pressing rocking bar, and the second push rod abuts against the second limiting body; and the first elastic member is fixedly arranged and connected to the bottom of the first push rod, the second elastic member is fixedly arranged and connected to the bottom of the second push rod, prepressures on the second elastic member and the first elastic member enable torque of the second push rod acting on the second end of the pressing rocking bar to be greater than torque of the first push rod acting on the first end of the pressing rocking bar, and a moving gap is reserved between the first limiting body and the first push rod in a pressing direction of the first push rod.

Through the arrangement of asymmetric torque on both sides of the pressing rocking bar, the first push rod and the second push rod can be always attached to the pressing rocking bar through dynamic compensation of the moving gap, thereby forming a very stable position and preventing the shaking of the switch. In addition, the number of tolerance dimension chains is further greatly reduced, and it is easier to control dimensions, thereby ensuring position accuracy of the switch.

BRIEF DESCRIPTION OF THE DRAWINGS

A switch for a vehicle according to the invention is described below with reference to the drawings. In the drawings.

LIST OF REFERENCE NUMERALS

Figure 1:
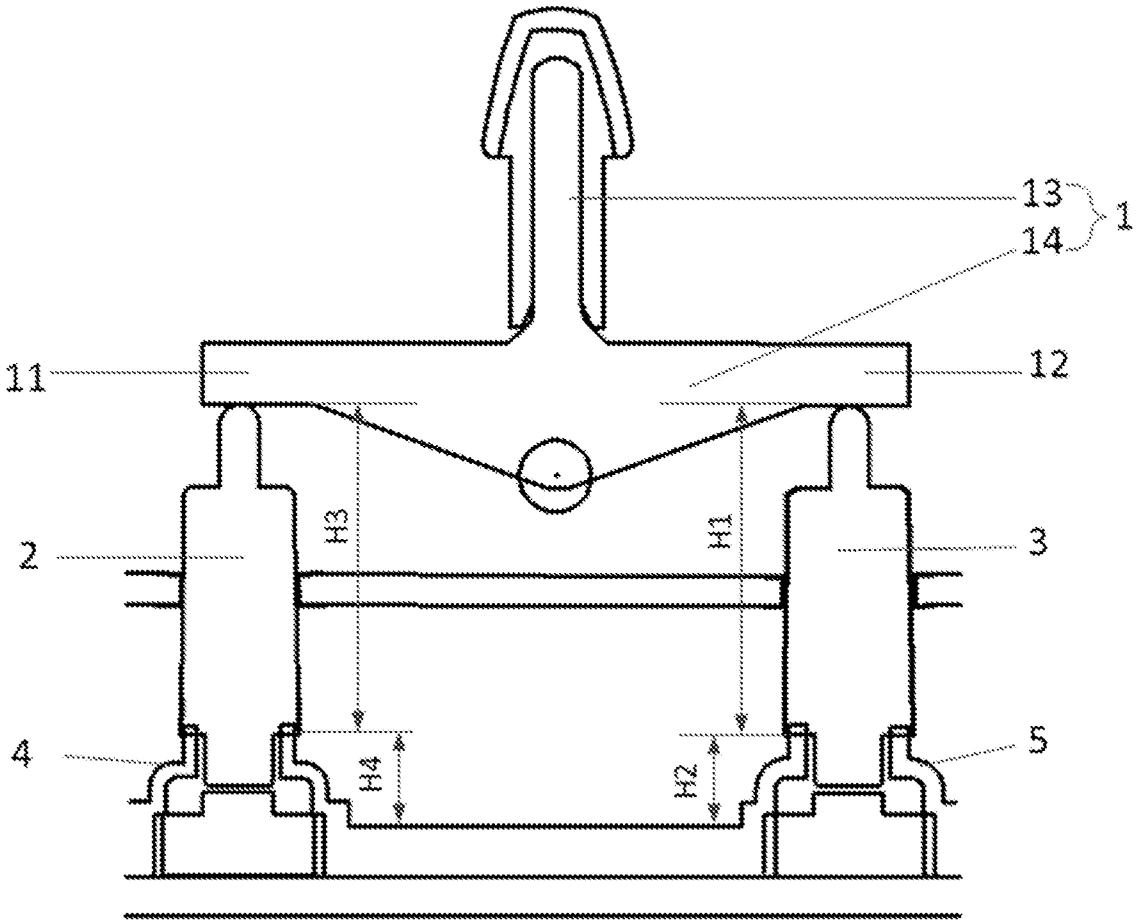
FIG. 1 is a schematic structural diagram of a switch in the prior art.

1—Pressing rocking bar; 11—First end; 12—Second end; 13—Poking key; 14—Rocking bar body; 2—First push rod; 21—First protrusion; 3—Second push rod; 31—Second protrusion; 4—First elastic member; 5—Second elastic member; 6—First limiting body; 7—Second limiting body; 8—Moving gap.

DETAILED DESCRIPTION OF EMBODIMENTS

Preferred implementations of the invention are described below with reference to the drawings. It should be understood by those skilled in the art that these implementations are only for explaining the technical principles of the invention and are not intended to limit the scope of protection of the invention. Those skilled in the art can make adjustments to the implementations as required so as to adapt to specific application scenarios. For example, although cross sections of a first limiting body and a second limiting body are each described in an n shape in the description, clearly various other forms, such as a rectangle, may be used in the invention, as long as an effect of limiting a first push rod and a second push rod is achieved.

It should be noted that in the description of the invention, the terms, such as "center", "upper", "lower", "left", "right", "vertical", "horizontal", "inner" and "outer", that indicate directions or positional relationships are based on the directions or positional relationships shown in the drawings only for convenience of description, and do not indicate or imply that the device or element must have a specific orientation, be constructed and operated in a specific orientation, and therefore cannot be understood as limitation to the invention. In addition, the terms "first", "second" and "third" are for descriptive purposes only and should not be construed as indicating or implying relative importance.

In addition, it should be further noted that, in the description of the invention, the terms "install", "connected to" and "connect" should be interpreted in a broad sense unless explicitly defined and limited otherwise. For example, a connection may be a fixed connection, a detachable connection or an integral connection; may be a mechanical connection or an electrical connection; and may be a direct connection, an indirect connection by means of an intermediary, or internal communication between two elements. For those skilled in the art, the specific meaning of the above-mentioned terms in the invention can be interpreted according to a specific situation.

First referring to FIG. 1, a working principle of a switch in the prior art is that when an external force is applied to a first end 11 of a pressing rocking bar 1, the pressing rocking bar 1 presses a first push rod 2, so that the first push rod 2 triggers a trigger switch of the first end 11 to implement connection of a circuit, and when the external force is released, a first elastic member 4 resets the first push rod 2 to implement disconnection of the circuit; when an external force is applied to a second end 12 of the pressing rocking bar 1, the pressing rocking bar 1 presses a second push rod 3, so that the second push rod 3 triggers a trigger switch of the second end 12 to implement connection of a circuit, and when the external force is released, a second elastic member 5 resets the second push rod 3 to implement disconnection of the circuit. Factors that limit the position of the pressing rocking bar 1 include a height (H4) of the first elastic member 4 and a height (H2) of the second elastic member 5, a height (H3) from a top end of the first push rod 2 to a top end of the first elastic member 4, and a height (H1) from a top end of the second push rod 3 to a top end of the second elastic member 5. Four tolerance dimension chains are provided. The tolerance dimension chains according to the invention are each an overall dimension or partial dimension of a member that affects the position of the pressing rocking bar 1, such as the height (H4) of the first elastic member 4 and the height (H3) from the top end of the first push rod 2 to the top end of the first elastic member 4.

To solve the problems of switch zero drift and shaking caused by the existence of a dimensional deviation of a switch of an existing vehicle, the invention provides three implementations of a switch for a vehicle, and technical solutions of the three implementations are as follows.

Figure 2:
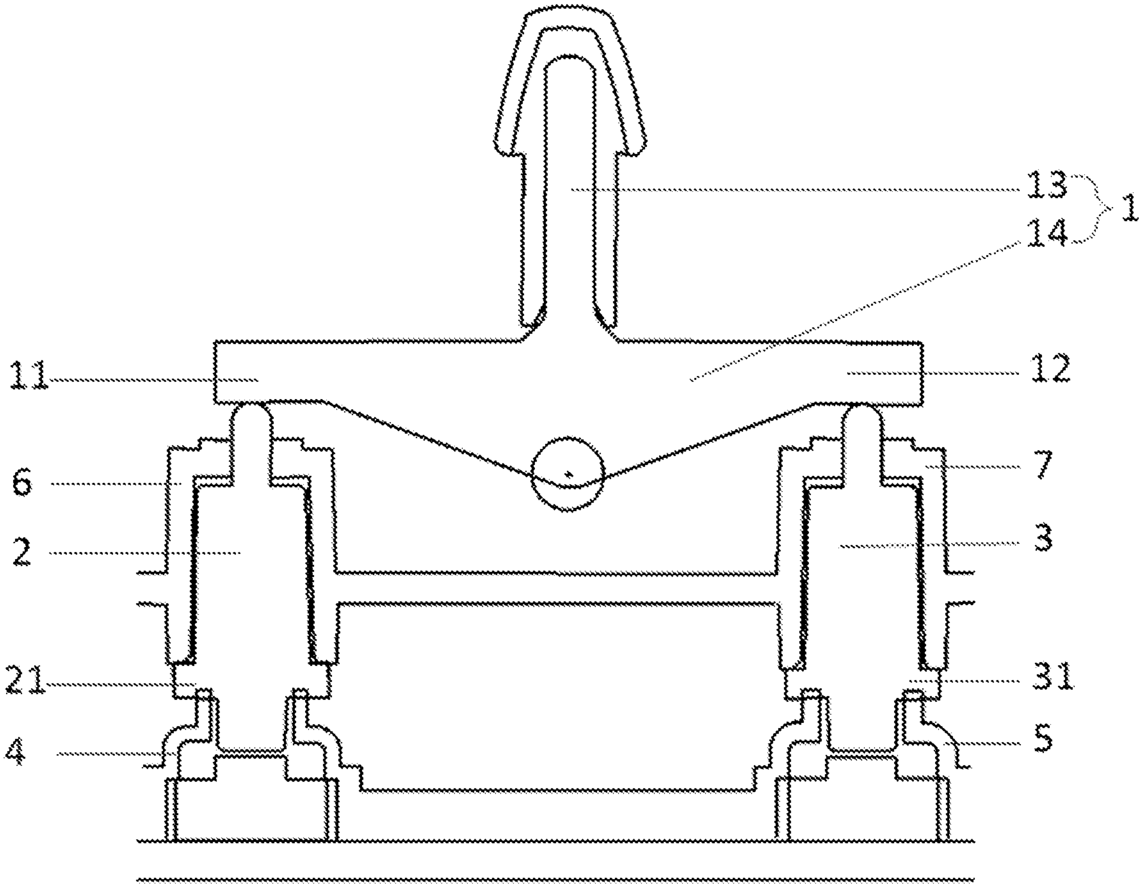
FIG. 2 is a schematic structural diagram of a first implementation of a switch for a vehicle according to the invention.
Figure 3:
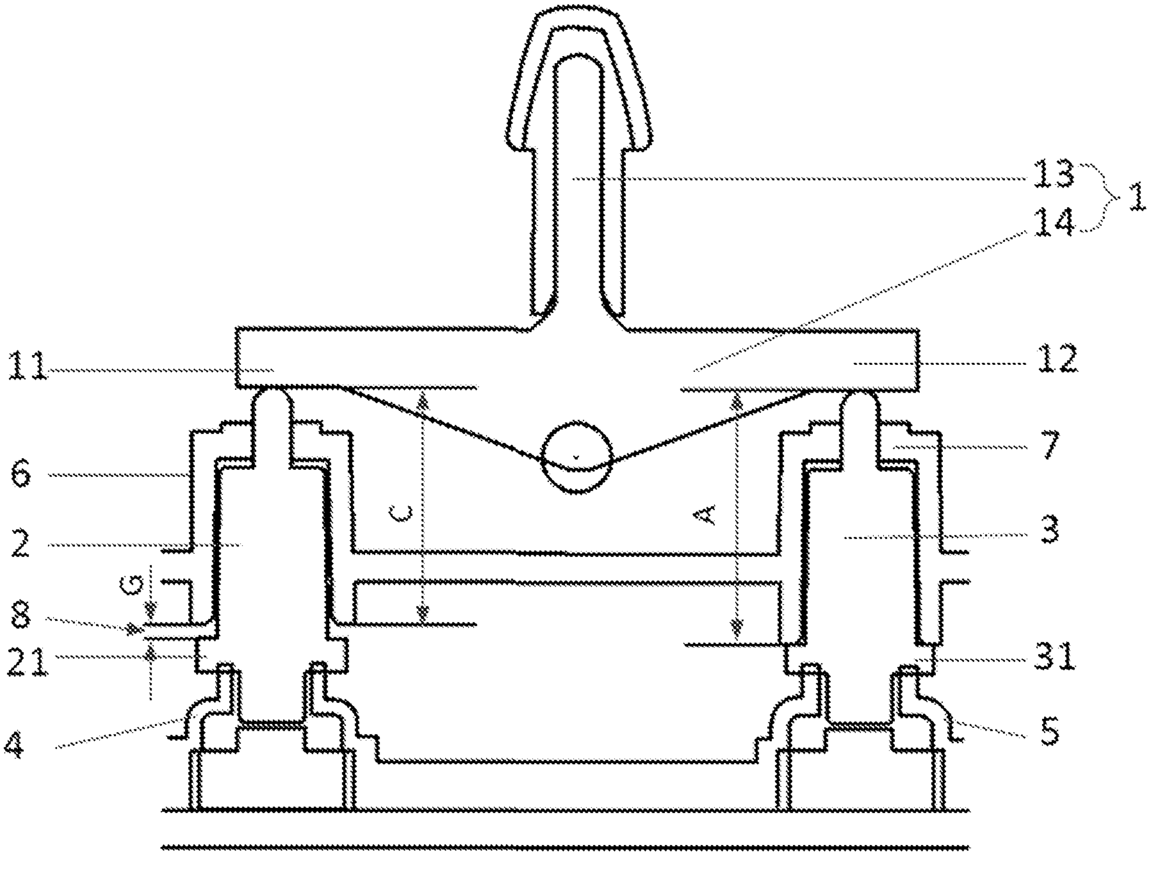
FIG. 3 is a schematic structural diagram of a first preferred technical solution of a second implementation of a switch for a vehicle according to the invention.
Figure 4:
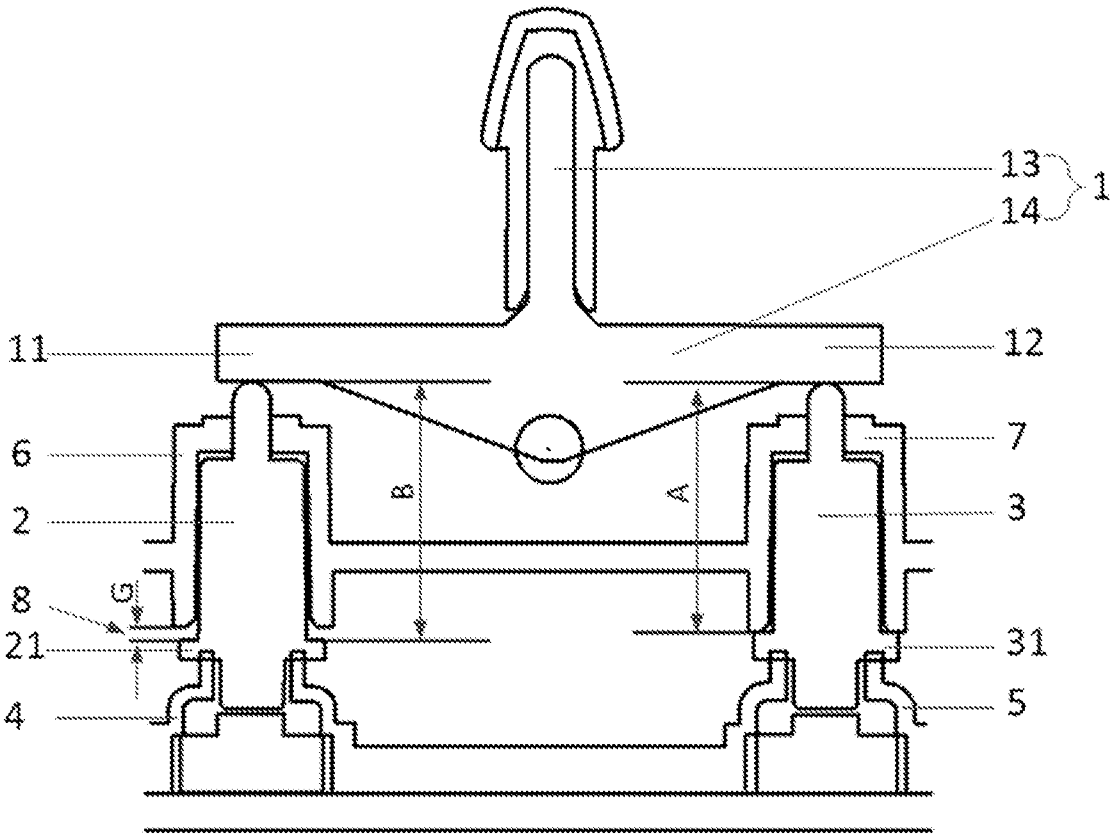
FIG. 4 is a schematic structural diagram of a second preferred technical solution of a second implementation of a switch for a vehicle according to the invention.

As shown in FIG. 2, FIG. 3 and FIG. 4, the switch according to the invention is a toggle switch, and its working principle is as follows: when an external force is applied to a first end 11 of a pressing rocking bar 1, the pressing rocking bar 1 presses a first push rod 2, so that the first push rod 2 triggers a trigger switch of the first end 11 to implement connection of a circuit, and when the external force is released, a first elastic member 4 resets the first push rod 2 to implement disconnection of the circuit; when an external force is applied to a second end 12 of the pressing rocking bar 1, the pressing rocking bar 1 presses a second push rod 3, so that the second push rod 3 triggers a trigger switch of the second end 12 to implement connection of a circuit, and when the external force is released, a second elastic member 5 resets the second push rod 3 to implement disconnection of the circuit. A first limiting body 6 and a second limiting body 7 limit a movement stroke of the first push rod 2 and the second push rod 3, which can prevent the first push rod 2 and the second push rod 3 from shaking in the first limiting body 6 and the second limiting body 7.

First implementation of a switch for a vehicle: With continued reference to FIG. 2, the switch comprises a pressing rocking bar 1, a first push rod 2, a second push rod 3, a first elastic member 4, a second elastic member 5, and a housing, wherein the pressing rocking bar 1 is pivotally connected to the housing, and a position point at which the pressing rocking bar 1 is pivotally connected to the housing is disposed between the first push rod 2 and the second push rod 3; the switch further comprises a first limiting body 6 and a second limiting body 7, the first limiting body 6 and the second limiting body 7 are fixedly arranged, the first push rod 2 runs through the first limiting body 6 and abuts against the bottom of a first end 11 of the pressing rocking bar 1, and the second push rod 3 runs through the second limiting body 7 and abuts against the bottom of a second end 12 of the pressing rocking bar 1; and the first elastic member 4 is fixedly arranged and connected to the bottom of the first push rod 2, the first push rod 2 abuts against the first limiting body 6 and makes the first elastic member 4 in a compressed state, the second elastic member 5 is fixedly arranged and connected to the bottom of the second push rod 3, and the second push rod 3 abuts against the second limiting body 7 and makes the second elastic member 5 in a compressed state.

The foregoing arrangement has the following advantages: the first push rod 2 abuts against the first limiting body 6, and the first elastic member 4 is in a compressed state; and the second push rod 3 abuts against the second limiting body 7, and the second elastic member 5 is in a compressed state. That is, the first limiting body 6 and the second limiting body 7 restrict the movement of the first push rod 2 and the second push rod 3 toward the pressing rocking bar 1, so that the first push rod 2 always abuts against the first limiting body 6 and the second push rod 3 always abuts against the second limiting body 7. In this case, no matter how much elastic force the first elastic member 4 and the second elastic member 5 release, neither the first push rod 2 nor the second push rod 3 can be jacked up. Compared with the prior art shown in FIG. 1, in the invention, the design mode in which the first push rod 2 and the second push rod 3 are always attached to the first limiting body 6 and the second limiting body 7 prevents tolerance chains of a switch system from being affected by heights of the first elastic member 4 and the second elastic member 5, so that the number of tolerance dimension chains can be reduced to two, thereby implementing better dimensional control, reducing zero drift, ensuring position accuracy of the switch, and preventing shaking of the switch.

In a preferred implementation of the foregoing implementation, cross sections of the first limiting body 6 and the second limiting body 7 are each in an n shape, the first push rod 2 is slidably connected to an inner wall of the first limiting body 6, the second push rod 3 is slidably connected to an inner wall of the second limiting body 7, the first push rod 2 is provided with a first protrusion 21, the second push rod 3 is provided with a second protrusion 31, the first protrusion 21 abuts against the bottom of the first limiting body 6 such that the first elastic member 4 is in a compressed state, and the second protrusion 31 abuts against the bottom of the second limiting body 7 such that the second elastic member 5 is in a compressed state.

The foregoing arrangement has the following advantages: the design mode in which the cross sections of the first limiting body 6 and the second limiting body 7 are each in an n shape enables the first push rod 2 and the second push rod 3 to have a greater contact area with the first limiting body 6 and the second limiting body 7, thereby ensuring that the first push rod 2 and the second push rod 3 do not deviate relative to a pressing direction, preventing shaking of the first push rod 2 and the second push rod 3 in the first limiting body 6 and the second limiting body 7, and further ensuring stability of the switch. Because the first protrusion 21 abuts against the bottom of the first limiting body 6 and the second protrusion 31 abuts against the bottom of the second limiting body 7, the number of tolerance chains of the switch system is independent of the heights of the first elastic member 4 and the second elastic member 5, and the number of the dimension chains is reduced, thereby implementing better dimensional control. In addition, the dimension design reduces zero drift, ensures position accuracy of the switch, and prevents shaking of the switch.

Second implementation of a switch for a vehicle: With continued reference to FIG. 3, the switch comprises a pressing rocking bar 1, a first push rod 2, a second push rod 3, a first elastic member 4, a second elastic member 5, and a housing, wherein the pressing rocking bar 1 is pivotally connected to the housing, and a position point at which the pressing rocking bar 1 is pivotally connected to the housing is disposed between the first push rod 2 and the second push rod 3; the switch further comprises a first limiting body 6 and a second limiting body 7, the first push rod 2 runs through the first limiting body 6 and abuts against the bottom of a first end 11 of the pressing rocking bar 1, the second push rod 3 runs through the second limiting body 7 and abuts against the bottom of a second end 12 of the pressing rocking bar 1, and the second push rod 3 abuts against the second limiting body 7; and the first elastic member 4 is fixedly arranged and connected to the bottom of the first push rod 2, and the second elastic member 5 is fixedly arranged and connected to the bottom of the second push rod 3. This differs from the first implementation of the switch for a vehicle in that: prepressures on the second elastic member 5 and the first elastic member 4 enable torque of the second push rod 3 acting on the second end 12 of the pressing rocking bar 1 to be greater than torque of the first push rod 2 acting on the first end 11 of the pressing rocking bar 1, and a moving gap 8 is reserved between the first limiting body 6 and the first push rod 2 in a pressing direction of the first push rod 2. The first limiting body 6 and the second limiting body 7 may be integrally connected to the housing, which can simplify a production process, or may be connected to the housing in a split manner, which facilitates production and operation.

Because in the invention, the torque of the second push rod 3 acting on the second end 12 of the pressing rocking bar 1 is greater than the torque of the first push rod 2 acting on the first end 11 of the pressing rocking bar 1, in a situation in which no limitation is imposed, the second push rod 3 will jack up the pressing rocking bar 1, and the first push rod 2 will be pressed according to the lever principle, thereby turning on the trigger switch of the first end 11. Therefore, in the invention, the second push rod 3 abuts against the second limiting body 7, thereby limiting the movement of the second push rod 3 toward the pressing rocking bar 1, and preventing the trigger switch of the first end 11 from being triggered. Further, due to the existence of tolerance, in the invention, the moving gap 8 is reserved between the first limiting body 6 and the first push rod 2 in the pressing direction of the first push rod 2, so that the first push rod 2 can be urged to move toward the pressing rocking bar 1 under the action of the elastic force of the first elastic member 4 to fill the moving gap 8. Furthermore, only through an accurate dimension design of the second push rod 3, the second push rod 3 is always attached to the pressing rocking bar 1, and the pressing rocking bar 1 is kept at a zero position. In this case, if the first push rod 2 is not attached to the pressing rocking bar 1 due to the existence of the tolerance, the arrangement of the moving gap 8 enables the first push rod 2 to move upward until the first push rod is attached to the first end 11 of the pressing rocking bar 1, thereby forming a very stable position, ensuring position accuracy of the switch, avoiding shaking of the switch, and improving the product texture. That is to say, the height of the moving gap 8 can compensate for a tolerance height between the first push rod 2 and the pressing rocking bar 1. In addition, because the torque of the second push rod 3 acting on the second end 12 of the pressing rocking bar 1 is greater than the torque of the first push rod 2 acting on the first end 11 of the pressing rocking bar 1, the second push rod 3 cannot be pressed downward, thereby preventing the trigger switch from being triggered.

This arrangement makes the second end 12 of the pressing rocking bar 1 form a very stable position, which becomes a positioning reference of the entire switch system, and reduces a double-side deviation of the pressing rocking bar 1 to a one-side deviation at the zero position. That is, the stable position of the pressing rocking bar 1 depends on the position of a final top end of the second push rod 3 (because of the existence of the asymmetric torque, the pressing rocking bar 1 is attached to the position of the top end of the second push rod 3 when the pressing rocking bar is in the final stable state). Therefore, the tolerance dimension chain of the switch system is mainly related to a machining error of a structural dimension on the side of the second push rod 3, and the tolerance dimension chain on the side of the first push rod 2 is reduced to zero. That is, the machining error on the side of the first push rod 2 does not cause the deviation of the entire structure. Taking FIG. 3 as an example, precise dimensional control only involves a length of A, that is, the height from a reference surface to the bottom of the second limiting body 7 with the bottom of the pressing rocking bar 1 as the reference surface, and precise dimension design is performed on the second push rod 3 of this part, while the height of the moving gap 8 is subjected to a relatively loose limitation and is greater than or equal to the tolerance that needs compensation. Therefore, a dimension of a member that determines the size of the moving gap is relatively loose in design, and may not be precisely controlled. Therefore, the dimension design may be ignored as zero, and the number of final dimension tolerance chains is reduced to one. Therefore, this arrangement can implement better dimensional control, reduce zero drift and ensure position accuracy of the switch.

In a preferred implementation of the foregoing implementation, the first push rod 2 is provided with a first protrusion 21, the first protrusion 21 is disposed between the first limiting body 6 and the first elastic member 4, the moving gap 8 is reserved between the first protrusion 21 and the first limiting body 6, the second push rod 3 is provided with a second protrusion 31, and the second push rod 3 abuts against the second limiting body 7 through the second protrusion 31. That is, the elastic force of the first elastic member 4 forces the first protrusion 21 to move toward the pressing rocking bar 1, so as to fill the moving gap 8, make the first push rod 2 and the second push rod 3 always attached to the pressing rocking bar 1, ensure position accuracy and keep a stable state.

The moving gap 8 between the first protrusion 21 and the first limiting body 6 is arranged by means of a plurality of implementations. In the invention, the following two implementations are used as examples for description.

With continued reference to FIG. 3, the first implementation is as follows: design dimensions of the first push rod 2 and the second push rod 3 are the same. With the bottom of the pressing rocking bar 1 used as a reference surface, a height from the bottom of the first limiting body 6 to the reference surface is less than a height from the bottom of the second limiting body 7 to the reference surface, and a height difference is a height of the moving gap 8.

The height from the bottom of the first limiting body 6 to the reference surface is C in FIG. 3, the height from the bottom of the second limiting body 7 to the reference surface is A in the figure, and the height of the moving gap 8 is G=A−C, that is, the height from the first protrusion 21 to the bottom of the first limiting body 6 in FIG. 3. That is, after the height of the moving gap 8 is determined, a dimension design is performed on the first limiting body 6 and the second limiting body 7. In this case, the same push rod is used as the first push rod 2 and the second push rod 3, which greatly improves consistency of push rod components, improves dimensional stability of the system, and reduces a production cost.

With continued reference to FIG. 4, the second implementation is as follows: design dimensions of the first push rod 2 and the second push rod 3 are different, and thicknesses and positions of the first protrusion 21 and the second protrusion 31 are different. The second protrusion 31 is disposed between the second limiting body 7 and the second elastic member 5. With the bottom of the pressing rocking bar 1 used as a reference surface, a height from the reference surface to a top end of the first protrusion 21 is greater than a height from the reference surface to a top end of the second protrusion 31, and a height difference is a height of the moving gap 8.

The height from the reference surface to the top end of the first protrusion 21 is B in FIG. 4, the height from the reference surface to the top end of the second protrusion 31 is A in the figure, and the height of the moving gap 8 is G=B−A. That is, after the height of the moving gap 8 is determined, the height of the first protrusion 21 may be designed, so as to control the size of B by using the height of the first protrusion 21.

Further, cross sections of the first limiting body 6 and the second limiting body 7 are each in an n shape, the first push rod 2 is slidably connected to an inner wall of the first limiting body 6, and the second push rod 3 is slidably connected to an inner wall of the second limiting body 7.

The foregoing arrangement has the following advantages: the design mode in which the cross sections of the first limiting body 6 and the second limiting body 7 are each in an n shape enables the first push rod 2 and the second push rod 3 to have a greater contact area with the first limiting body 6 and the second limiting body 7, and prevents the first push rod 2 and the second push rod 3 from shaking Taking the first push rod 2 as an example for description, it can be seen from a sectional view that, in the pressing direction, contact points between the first push rod 2 and the first limiting body 6 form a longer straight line, thereby ensuring that the first push rod 2 does not deviate relative to the pressing direction, preventing the first push rod 2 from shaking in the first limiting body 6, and further ensuring stability of the switch.

Further, a position point at which the pressing rocking bar 1 is pivotally connected to the housing is located at a middle portion of the pressing rocking bar 1. This arrangement can eliminate the influence of dead weight of the pressing rocking bar 1 on balance thereof. In addition, asymmetric torque can be designed more conveniently. That is, if distances from position points of the first push rod 2 and the second push rod 3 acting on two ends of the pressing rocking bar 1 to pivotally connected position points are the same, force arms are the same. In this case, different prepressures can be designed by using the first elastic member 4 and the second elastic member 5, to achieve an effect of different torques at two ends. In a preferred implementation, the prepressure of the second elastic member 5 is 0.5 N higher than the prepressure of the first elastic member 4, so that a pressing touch is not affected while position accuracy of the switch is ensured.

Further, the pressing rocking bar 1 comprises a poking key 13 and a rocking bar body 14, the poking key 13 is disposed on the rocking bar body 14, the first push rod 2 runs through the first limiting body 6 and abuts against the bottom of a first end 11 of the rocking bar body 14, and the second push rod 3 runs through the second limiting body 7 and abuts against the bottom of a second end 12 of the rocking bar body 14. That is, the arrangement of the poking key 13 can facilitate user operation and improve user experience. In a preferred implementation, an outer side of a toggle part is coated with a decorative skin, which makes the appearance of the switch more beautiful, and also plays the role of skid resistance and the like.

Third implementation of a switch for a vehicle: This implementation is a variation of the second implementation of a switch for a vehicle, specifically as follows: the switch comprises a pressing rocking bar 1, a first push rod 2, a second push rod 3, a first elastic member 4, a second elastic member 5, and a housing, wherein the pressing rocking bar 1 is pivotally connected to the housing, and a position point at which the pressing rocking bar 1 is pivotally connected to the housing is disposed between the first push rod 2 and the second push rod 3; the switch further comprises a first limiting body 6 and a second limiting body 7, wherein the first limiting body 6 and the second limiting body 7 are fixedly arranged, the first push rod 2 runs through the first limiting body 6 and abuts against the bottom of a first end 11 of the pressing rocking bar 1, the second push rod 3 runs through the second limiting body 7 and abuts against the bottom of a second end 12 of the pressing rocking bar 1, and the second push rod 3 abuts against the second limiting body 7; and the first elastic member 4 is fixedly arranged and connected to the bottom of the first push rod 2, the second elastic member 5 is fixedly arranged and connected to the bottom of the second push rod 3, and prepressures on the second elastic member 5 and the first elastic member 4 enable torque of the second push rod 3 acting on the second end 12 of the pressing rocking bar 1 to be greater than torque of the first push rod 2 acting on the first end 11 of the pressing rocking bar 1. The variation lies in that: the first push rod 2 is a cylindrical rod (not shown in the figure) without a boss.

Because the first push rod 2 is a cylindrical rod without a boss, the first limiting body 6 cannot limit the movement of the first push rod 2 in the pressing direction. Under the action of the first elastic member 4, the first push rod 2 can be pushed to always move toward the pressing rocking bar 1 until the first push rod is blocked by torque greater than torque of the first push rod 2 acting on the pressing rocking bar 1. Therefore, this arrangement can ensure that the first push rod 2 and the second push rod 3 are always attached to the pressing rocking bar 1, and the second push rod 3 cannot be pressed downward, so that the position accuracy and stability of the switch can be ensured only by a precise dimension design of the second push rod 3, and the switch can be prevented from shaking. In addition, the cylindrical rod is simple in structure and convenient to manufacture and can reduce a production cost.

The first elastic member 4 and the second elastic member 5 according to the invention may be rubber pads, or springs, or the like, as long as they have elasticity and enable the first push rod 2 and the second push rod 3 to move toward the pressing rocking bar 1.

In conclusion, the zero drift of the switch according to the invention is reduced to the largest extent through the design mode in which the first protrusion 21 and the second protrusion 31 are always attached to the first limiting body 6 and the second limiting body 7. Through the arrangement of the asymmetric torque on two sides of the pressing rocking bar 1, a double-side deviation is reduced to a one-side deviation when the switch is at a zero position, and the number of dimension chains is reduced to a half of the original number, thereby ensuring a more accurate position and ensuring that the switch is always in a stable state.

It should be noted that the foregoing implementations are only used to explain the principles of the invention, and are not intended to limit the scope of protection of the invention. Those skilled in the art can adjust the foregoing structures without departing from the principles of the invention, so that the invention is applicable to more specific application scenarios.

For example, in an alternative implementation, the first push rod 2 may be provided with an elastic clamping head, the first limiting body 6 may be provided with a clamping groove suitable for the elastic clamping head, and a distance between the elastic clamping head and the clamping groove is the moving gap 8. When the first push rod 2 moves toward the pressing rocking bar 1, the clamping groove can limit the first push rod 2. When the first push rod 2 moves in the pressing direction, the elastic clamping head on the first push rod 2 can be separated from the clamping groove as long as the moving gap 8 is reserved between the first limiting body 6 and the first push rod 2. These implementations do not depart from the principles of the invention and therefore shall fall within the scope of protection of the invention.

For example, in another alternative implementation, the first protrusion 21 may abut against an inner wall of a top side of the n-shaped first limiting body 6, as long as the first protrusion 21 abuts against the first limiting body 6. These implementations do not depart from the principles of the invention and therefore shall fall within the scope of protection of the invention.

For example, in another alternative implementation, cross sections of the first limiting body 6 and the second limiting body 7 may be rectangular or in another shape, as long as the first push rod 2 and the second push rod 3 can be limited. These implementations do not depart from the principles of the invention and therefore shall fall within the scope of protection of the invention.

For example, in another alternative implementation, a position point at which the pressing rocking bar 1 is pivotally connected to the housing may not be located on a middle portion of the pressing rocking bar 1, as long as the torque of the second push rod 3 acting on the second end 12 of the pressing rocking bar 1 is greater than the torque of the first push rod 2 acting on the first end 11 of the pressing rocking bar 1. These implementations do not depart from the principles of the invention and therefore shall fall within the scope of protection of the invention.

In addition, the invention further provides a vehicle. The vehicle is provided with a switch for a vehicle according to any one of the foregoing implementations.

Heretofore, the technical solutions of the invention have been described in conjunction with the preferred implementations shown in the drawings, however, those skilled in the art can readily understand that the scope of protection of the invention is obviously not limited to these specific implementations. Those skilled in the art could make equivalent changes or substitutions to the related technical features without departing from the principles of the invention, and all the technical solutions after the changes or the substitutions fall within the scope of protection of the invention.

What is claimed is:

1. A switch for a vehicle, the switch comprising:

a pressing rocking bar, a first push rod, a second push rod, a first elastic member, a second elastic member, and a housing, wherein the pressing rocking bar is pivotally connected to the housing, and a position point at which the pressing rocking bar is pivotally connected to the housing is disposed between the first push rod and the second push rod;

wherein the switch further comprises a first limiting body and a second limiting body, the first limiting body and the second limiting body are fixedly arranged, the first push rod runs through the first limiting body and abuts against a bottom of a first end of the pressing rocking bar, the second push rod runs through the second limiting body and abuts against a bottom of a second end of the pressing rocking bar, and the second push rod abuts against the second limiting body; and wherein the first elastic member is fixedly arranged and connected to a bottom of the first push rod, the second elastic member is fixedly arranged and connected to a bottom of the second push rod, prepressures on the second elastic member and the first elastic member enable torque of the second push rod acting on the second end of the pressing rocking bar to be greater than torque of the first push rod acting on the first end of the pressing rocking bar, and a moving gap is reserved between the first limiting body and the first push rod in a pressing direction of the first push rod.

2. The switch for a vehicle according to claim 1, wherein the first push rod is provided with a first protrusion, the first protrusion is disposed between the first limiting body and the first elastic member, the moving gap is reserved between the first protrusion and the first limiting body, the second push rod is provided with a second protrusion, and the second push rod abuts against the second limiting body through the second protrusion.

3. The switch for a vehicle according to claim 2, wherein with a bottom of the pressing rocking bar used as a reference surface, a height from a bottom of the first limiting body to the reference surface is less than a height from a bottom of the second limiting body to the reference surface, and a height difference is a height of the moving gap.

4. The switch for a vehicle according to claim 2, wherein the second protrusion is disposed between the second limiting body and the second elastic member; and with the bottom of the pressing rocking bar used as a reference surface, a height from the reference surface to a top end of the first protrusion is greater than a height from the reference surface to a top end of the second protrusion, and a height difference is a height of the moving gap.

5. The switch for a vehicle according to claim 2, wherein cross sections of the first limiting body and the second limiting body are each in an n shape, the first push rod is slidably connected to an inner wall of the first limiting body, and the second push rod is slidably connected to an inner wall of the second limiting body; and/or the first limiting body and the second limiting body are integrally connected to the housing.

6. The switch for a vehicle according to claim 1, wherein a position point at which the pressing rocking bar is pivotally connected to the housing is located at a middle portion of the pressing rocking bar; and/or the pressing rocking bar comprises a poking key and a rocking bar body, the poking key is disposed on the rocking bar body, the first push rod runs through the first limiting body and abuts against the bottom of a first end of the rocking bar body, and the second push rod runs through the second limiting body and abuts against the bottom of a second end of the rocking bar body.

7. A switch for a vehicle, the switch comprising:

a pressing rocking bar, a first push rod, a second push rod, a first elastic member, a second elastic member, and a housing, wherein the pressing rocking bar is pivotally connected to the housing, and a position point at which the pressing rocking bar is pivotally connected to the housing is disposed between the first push rod and the second push rod;

wherein the switch further comprises a first limiting body and a second limiting body, the first limiting body and the second limiting body are fixedly arranged, the first push rod runs through the first limiting body and abuts against a bottom of a first end of the pressing rocking bar, and the second push rod runs through the second limiting body and abuts against a bottom of a second end of the pressing rocking bar; and wherein the first elastic member is fixedly arranged and connected to a bottom of the first push rod, the first push rod abuts against the first limiting body and makes the first elastic member in a compressed state, the second elastic member is fixedly arranged and connected to a bottom of the second push rod, and the second push rod abuts against the second limiting body and makes the second elastic member in a compressed state;

wherein the first elastic member has no contact with the first limiting body and the second elastic member has no contact with the second limiting body; and wherein the bottom of the first end of the pressing rocking bar has a substantially horizontal plane which the first push rod abuts against and rolls over, and wherein the bottom of the second end of the pressing rocking bar has a substantially horizontal plane which the second push rod abuts against and rolls over.

8. The switch for a vehicle according to claim 7, wherein cross sections of the first limiting body and the second limiting body are each in an n shape, the first push rod is slidably connected to an inner wall of the first limiting body, the second push rod is slidably connected to an inner wall of the second limiting body, the first push rod is provided with a first protrusion, the second push rod is provided with a second protrusion, the first protrusion abuts against a bottom of the first limiting body and makes the first elastic member in a compressed state, and the second protrusion abuts against a bottom of the second limiting body and makes the second elastic member in a compressed state.

9. A vehicle, comprising a switch for a vehicle, the switch comprising a pressing rocking bar, a first push rod, a second push rod, a first elastic member, a second elastic member, and a housing, wherein the pressing rocking bar is pivotally connected to the housing, and a position point at which the pressing rocking bar is pivotally connected to the housing is disposed between the first push rod and the second push rod;

wherein the switch further comprises a first limiting body and a second limiting body, the first limiting body and the second limiting body are fixedly arranged, the first push rod runs through the first limiting body and abuts against a bottom of a first end of the pressing rocking bar, the second push rod runs through the second limiting body and abuts against a bottom of a second end of the pressing rocking bar, and the second push rod abuts against the second limiting body; and wherein the first elastic member is fixedly arranged and connected to a bottom of the first push rod, the second elastic member is fixedly arranged and connected to a bottom of the second push rod, prepressures on the second elastic member and the first elastic member enable torque of the second push rod acting on the second end of the pressing rocking bar to be greater than torque of the first push rod acting on the first end of the pressing rocking bar, and a moving gap is reserved between the first limiting body and the first push rod in a pressing direction of the first push rod.

* * * * *